United States Patent
Carré

(10) Patent No.: US 9,073,679 B2
(45) Date of Patent: Jul. 7, 2015

(54) FROZEN FOOD PACKAGE AND METHOD OF USE

(75) Inventor: Eric A. Carré, Grayslake, IL (US)

(73) Assignee: Provita Cuisine, LLC, Schaumburg, IL (US)

( * ) Notice: Subject to any disclaimer, the term of this patent is extended or adjusted under 35 U.S.C. 154(b) by 627 days.

(21) Appl. No.: 12/566,209

(22) Filed: Sep. 24, 2009

(65) Prior Publication Data

US 2010/0015308 A1    Jan. 21, 2010

Related U.S. Application Data

(63) Continuation of application No. 11/703,967, filed on Feb. 8, 2007, now Pat. No. 7,750,274, which is a continuation-in-part of application No. 11/351,766, filed on Feb. 10, 2006, now abandoned.

(51) Int. Cl.
*B65B 25/22* (2006.01)
*B65B 29/08* (2006.01)
(Continued)

(52) U.S. Cl.
CPC .......... *B65D 77/003* (2013.01); *B65D 81/3461* (2013.01); *B65D 2581/3425* (2013.01)

(58) Field of Classification Search
CPC ............ F24C 15/32; A21B 1/00; A21B 1/22; B65B 25/22; B65B 29/08; F27B 7/00; F27B 9/06; F27B 5/14; A47J 37/08; A47J 37/07; A47J 27/00; A47J 27/04
USPC .......... 219/725–735, 756–757; 426/106–131, 426/241, 412
See application file for complete search history.

(56) References Cited

U.S. PATENT DOCUMENTS 3,985,991 A * 10/1976 Levinson .................. 219/729
4,390,555 A    6/1983 Levinson
4,425,368 A *  1/1984 Watkins .................... 426/107
(Continued)

FOREIGN PATENT DOCUMENTS

CH        684985      2/1995
EP        0 500 931   9/1992
(Continued)

OTHER PUBLICATIONS

Search Report (EP07750621), Jul. 14, 2011.

*Primary Examiner* — Dana Ross
*Assistant Examiner* — Michael Laflame, Jr.
(74) *Attorney, Agent, or Firm* — DLA Piper LLP (US)

(57) ABSTRACT

A frozen food package and method of producing and using the same is disclosed. The food package includes a bag which is freezable, ovenable and microwaveable. A frozen food assembly within the bag includes uncooked food, preferably an entree. Typically, the food assembly includes a meat, a fruit or vegetable, and a flavoring liquid such as a broth or stock, and may include infused oil or a dairy product. The uncooked food is typically embedded in the frozen liquid to facilitate handling and shipping and to align the frozen food with a display window of the bag. Chemical preservatives are not necessary and sauces may be omitted although sauces are not burned in the cooking process. The method typically includes sealing the frozen uncooked food in the liquid-impermeable bag and cooking the food in the sealed bag. The resulting dish is a substantial improvement over the well-known precooked frozen meals.

9 Claims, 3 Drawing Sheets

(51) Int. Cl.
*B65D 77/00* (2006.01)
*B65D 81/34* (2006.01)

(56) References Cited

U.S. PATENT DOCUMENTS

| | | | |
|---|---|---|---|
| 4,521,910 A * | 6/1985 | Keppel et al. | 383/10 |
| 4,745,249 A * | 5/1988 | Daniels | 219/730 |
| 4,834,247 A * | 5/1989 | Oshima et al. | 426/107 |
| 4,906,806 A * | 3/1990 | Levinson | 219/731 |
| 4,911,938 A | 3/1990 | Fisher et al. | |
| 4,923,704 A * | 5/1990 | Levinson | 426/243 |
| 4,980,529 A * | 12/1990 | Bolton | 219/752 |
| 5,059,436 A | 10/1991 | Clark | |
| 5,314,705 A | 5/1994 | Hanson et al. | |
| 5,807,598 A | 9/1998 | Liberman et al. | |
| 5,863,578 A | 1/1999 | Guarino | |
| 5,928,555 A * | 7/1999 | Kim et al. | 219/729 |
| 6,033,114 A | 3/2000 | Grimm et al. | |
| 6,054,698 A | 4/2000 | Mast | |
| 6,063,423 A | 5/2000 | Virtanen | |
| 6,098,529 A * | 8/2000 | Brummett et al. | 99/467 |
| 6,183,789 B1 * | 2/2001 | Nilsson et al. | 426/113 |
| 6,248,381 B1 | 6/2001 | Liberman et al. | |
| 6,455,084 B2 * | 9/2002 | Johns | 426/107 |
| 6,488,973 B1 * | 12/2002 | Wright | 426/114 |
| 6,896,919 B2 * | 5/2005 | Wright | 426/92 |
| 7,015,442 B2 | 3/2006 | Tucker, Jr. et al. | |
| 7,019,271 B2 | 3/2006 | Wnek et al. | |
| 7,022,360 B2 | 4/2006 | Liberman et al. | |
| 7,351,942 B2 * | 4/2008 | Wnek et al. | 219/730 |
| 7,445,805 B2 | 11/2008 | Liberman | |
| 7,750,274 B2 | 7/2010 | Carre | |
| 8,061,265 B2 * | 11/2011 | Cambay | 99/324 |
| 8,063,344 B2 * | 11/2011 | Cole et al. | 219/730 |
| 8,087,827 B2 * | 1/2012 | Mir | 383/102 |
| 2003/0017235 A1 | 1/2003 | Wright | |
| 2003/0141297 A1 * | 7/2003 | McCarthy et al. | 219/725 |
| 2003/0178419 A1 | 9/2003 | Policappelli | |
| 2004/0115318 A1 | 6/2004 | Jannssen et al. | |
| 2005/0040161 A1 * | 2/2005 | Lin et al. | 219/725 |
| 2005/0173425 A1 * | 8/2005 | Wnek et al. | 219/730 |
| 2005/0184065 A1 * | 8/2005 | Tucker et al. | 219/730 |
| 2005/0230384 A1 * | 10/2005 | Robison et al. | 219/730 |
| 2005/0281919 A1 | 12/2005 | Ueno et al. | |
| 2006/0113300 A1 * | 6/2006 | Wnek et al. | 219/730 |
| 2007/0187397 A1 | 8/2007 | Carre | |
| 2007/0187398 A1 | 8/2007 | Carre | |
| 2007/0251942 A1 * | 11/2007 | Cole et al. | 219/730 |
| 2007/0251943 A1 * | 11/2007 | Wnek et al. | 219/730 |
| 2008/0199579 A1 | 8/2008 | Carre | |

FOREIGN PATENT DOCUMENTS

| | | |
|---|---|---|
| EP | 0 826 314 | 4/1998 |
| EP | 0955246 A2 | 10/1999 |
| FR | 2 663 205 | 12/1991 |
| GB | 2 240 253 | 7/1991 |
| JP | 11 221056 | 8/1999 |
| WO | WO 99/63833 | 12/1999 |
| WO | WO 00/19830 | 4/2000 |

* cited by examiner

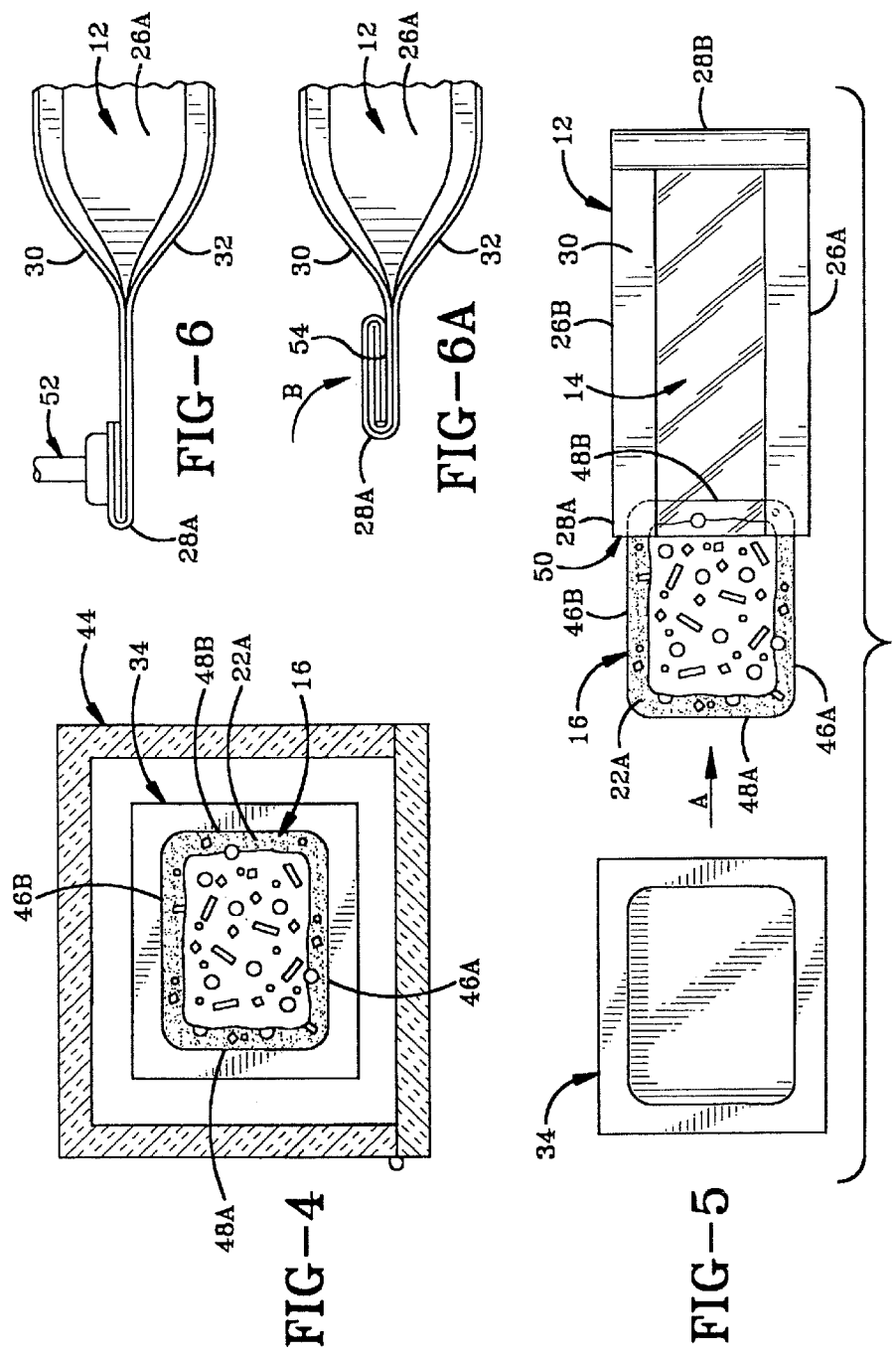

FROZEN FOOD PACKAGE AND METHOD OF USE

CROSS REFERENCE TO RELATED APPLICATIONS

This application is a continuation of U.S. patent application Ser. No. 11/703,967, filed Feb. 8, 2007 now U.S. Pat. No. 7,750,274 which, in turn is a continuation in part of U.S. patent application Ser. No. 11/351,766, filed Feb. 10, 2006, now abandoned; the disclosure of which is hereby incorporated by reference.

BACKGROUND OF THE INVENTION

1. Technical Field

The present invention relates generally to food bags and a method of using the same. More particularly, the invention relates to a food bag in which an entree or other food item may be cooked. Specifically, the invention relates to such a food bag in which frozen uncooked food may be stored, displayed and cooked in a standard or microwave oven.

2. Background Information

Amongst the various containers in which food may be cooked, there are a few bags formed of paper, plastic or a combination thereof which typically allow for the heating or cooking of a limited range of food items. For example, certain popcorn bags allow for the cooking of popcorn in a microwave oven. Such bags allow for the expansion thereof due to vaporization of water within the popcorn. However, such bags have an opening end which easily opens during the popping process in order to allow the exhaust of steam and the like from the bag. Thus, such bags are not suitable for cooking food items which include a significant amount of liquid which would drain out of such a bag and make a substantial mess and potentially cause safety hazards.

In addition, there are various types of frozen food items which are typically stored in trays and normally referred to as TV dinners. TV dinners and the like utilize precooked ingredients which result in a relatively dry entrée or other food when heated in a microwave or standard oven.

More recent developments include food bags having a window for displaying the food wherein the bags are ovenable, microwaveable and freezable. For example, U.S. Pat. No. 6,033,114 granted to Grimm et al. provides such a bag. This food bag includes an inner layer which is transparent and formed of a plastic sheet or film and an outer layer which is substantially opaque and typically made of paper. A portion of the plastic sheet provides the window through which food items are visible and provides a barrier to moisture, oil and aroma while also being breathable and heat sealable. The preferred material of this bag is a polyester material commercially available as "MYLAR"®. Said bag is configured for packaging heated, greasy food items for display in the carry-out food industry. Thus, for instance, a rotisserie chicken or other moist food item which has been cooked may be displayed in this bag, purchased by a consumer and reheated at home in a standard or microwave oven with leftovers stored in a bag in the freezer for later consumption.

Thus, the use of a food bag for displaying a cooked food item and reheating the food item therein is known in the art. However, there is still a need in the art for frozen meals or other food items which can be displayed in a store and cooked at home. More particularly, there is a need in the art for such frozen foods which are primarily made from fresh, uncooked ingredients.

BRIEF SUMMARY OF THE INVENTION

The present invention provides an apparatus comprising a bag which is freezable and at least one of ovenable and microwaveable; and a frozen food assembly which includes uncooked food and is disposed within the bag.

The present invention further provides a method comprising the steps of providing frozen uncooked food in a bag; sealing the bag so that the bag is impermeable to liquids; and cooking the food in the bag while the bag is sealed.

BRIEF DESCRIPTION OF THE SEVERAL VIEWS OF THE DRAWINGS

FIG. 4 is a diagrammatic view showing the tray in a freezer with the food items having been frozen in the freezing tray to produce a frozen molded dish.

FIG. 5 is a diagrammatic view showing the frozen molded dish being inserted into the food bag.

FIG. 6 is a fragmentary side elevational view showing the bag having been heat sealed.

FIG. 6A is a view similar to FIG. 6 showing the bag being additionally sealed by an adhesive.

Similar numbers refer to similar parts throughout the drawings.

DETAILED DESCRIPTION OF THE INVENTION

Figure 1:
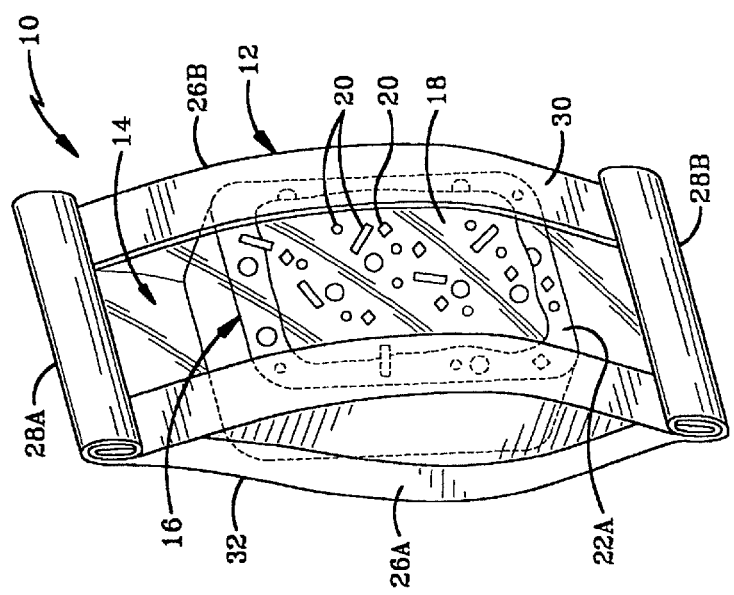
FIG. 1 is perspective view of the frozen food package of the present invention showing the frozen food items visible through the window of the bag.

The frozen food package of the present invention is indicated generally at 10 in FIG. 1 and the method of preparing and using the food package is described with reference to FIGS. 2-10. As shown in FIG. 1, food package 10 includes an expandable food bag 12 having a transparent window 14 and a frozen food item or assembly 16 which is typically in the form of an entrée. Food assembly 16 is primarily formed of frozen fresh, uncooked ingredients. Food assembly 16 typically includes a meal-sized source of protein most often in the form of a meat 18 or for instance a bean-based food item. Food assembly 16 typically also includes pieces 20 of vegetables, fruits, spices or the like.

Food assembly 16 typically further includes a frozen liquid 22A which may involve the use of water, oil (preferably an infused oil), water-based liquids such as meat or vegetable-based broths or stocks (e.g. jus, fumet etc.), and milk, cream or other dairy based products. Jus is a prepared natural juice from various types of meat or poultry, and fumet is a light fish stock. Food assembly 16 may be free of pre-made sauces and chemical preservatives, although each of these may be used if desired. Although food assembly 16 is primarily formed of uncooked food, cooked or partially cooked food may be included. The broths, stocks and sauces are all normally formed by cooking, and other cooked elements may also be used if desired.

Liquid 22A may simply be water, or may be jus, fumet or another broth or stock with or without further additives, and is typically mostly water. Meat stocks may include some gelatin derived from bones. While liquid 22A is typically free of an added thickening agent such as starch, gums, flour or gelatin, these may be included although usually in relatively small amounts. Liquid 22A is preferably at least 90.0% water by weight or any percentage thereabove up to 100%. These percentages are associated roughly with the amount of soluble solids in meat stocks and flavored broths, which may be determined by a refractometer or determined by measuring the solid remaining upon evaporation of said stocks or broths. For instance, such solids for meat or fish stocks typically ranges from about 4.0 to 8.0% by weight and for flavored broths typically ranges from about 0.25 to 4.0% by weight with the remainder being water.

Various viscosities are given hereafter, all of which are for liquids at 150° F. (65.5° C.), including water with a viscosity of about 0.0 cPs. Flavored broths typically have a viscosity anywhere in the range of about 0.0 to 500 cPs. Meat or fish stocks (jus, fumet) typically have a viscosity anywhere in the range of about 500 to 1000 cPs, this higher viscosity relative to the broths due primarily to the above-noted gelatin from the bones. The viscosity of liquid 22A thus typically falls within these ranges.

Sauces which are part of food assembly 16 typically have a viscosity which is substantially greater than that of liquid 22A although in general very light sauces are similar in viscosity to the more viscous stocks. Sauces have a viscosity anywhere in the range of about 1,000 to 8,000 cPs, the former being very light and the latter being very heavy. A medium viscosity sauce is generally somewhere around 4,000 cPs. Thus, most sauces are somewhere in the range of about 2,000 to 7,000 cPs; usually in the range of 2,000 to 6,000 cPs; and often in the range of 3,000 to 5,000 cPs although these numbers may vary substantially depending on the type of sauce.

Preferably, there is sufficient frozen liquid 22A in order to hold the various items of assembly 16 together as a block or a unit although small pieces of food may be separate from the block or unit. Thus, meat 18 and pieces 20 are usually embedded in frozen liquid 22A, and preferably all or substantially all of the food is embedded therein. The formation of this block or unit is an important aspect in handling and assembly as discussed further below.

In addition, frozen liquid 22A provides distinct advantages during the cooking process described further below. The portion size, or total weight of food assembly 16, may vary and is typically set within a range suitable for a single meal, more or less. In most cases, this would be somewhere in the range of 8.0 to 16.0 ounces although in light of the difference in people's sizes and appetites, such meal sizes are typically somewhere in the range of about 4.0 to 32.0 ounces. While these numbers do not limit the scope of the invention, they give an idea of the portion sizes typically involved. Some more specific commercially suitable portion sizes within bag 12 are respectively about 8.0, 12.0, 24.0 and 30.0 ounces. For a 12.0 ounce portion size, liquid 22A has a weight somewhere in the range of about 1.0 to 3.0 ounces, and more typically about 1.5 to 2.0 ounces. More generally, of the total weight of assembly 16, liquid 22A makes up about 8.0 to 25.0%, more typically about 10.0 to 20.0%, and even more typically about 12.0 to 16.0%.

Food bag 12 may come in a variety of shapes, although it is preferred that the bag have an outer perimeter 24 having substantially straight opposed sides 26A and B and opposed ends 28A and B. Bag 12 has a front 30 and an opposed rear 32 with window 14 disposed along front 30. Any bag suitable to the process may be used. A preferred bag for the present method is described in U.S. Pat. No. 6,033,114 granted to Grimm et al., which was discussed in the Background section of the present application and the contents of which are incorporated herein by reference. Bag 12 is freezable, ovenable and microwaveable.

Figure 2:
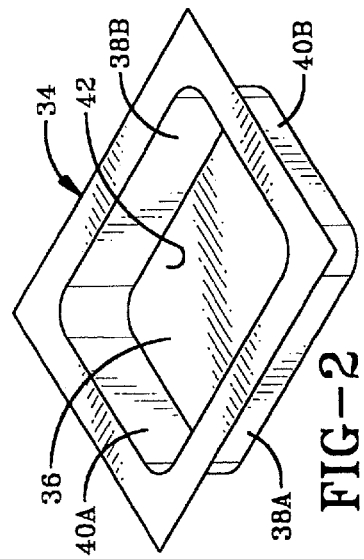
FIG. 2 is a perspective view of the freezing tray in which the food items of the present invention are frozen prior to insertion in the food bag.

With reference to FIG. 2, a freezing container or tray 34 is provided for freezing the food items to make up frozen food assembly 16. Tray 34 has a substantially flat bottom wall 36, a pair of opposed substantially flat side walls 38A and 38B and a pair of opposed substantially flat end walls 40A and 40B defining therewithin a rectangular freezing cavity 42. Cavity 42 serves as a mold for producing a frozen molded form made up of frozen food assembly 16.

Figure 3:
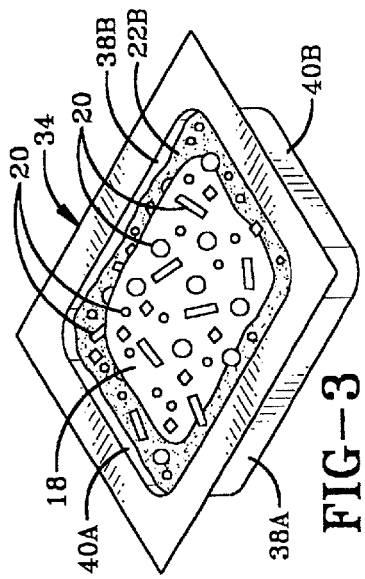
FIG. 3 is a perspective view similar to FIG. 2 showing the uncooked food items having been placed in the tray prior to the freezing thereof.

As shown in FIG. 3, meat 18, pieces 20 and liquid 22B which will be frozen to become frozen liquid 22A is placed in cavity 42 of tray 34. At this point, meat 18 and pieces 20 are uncooked and as fresh as possible. Liquid 22B most preferably completely covers bottom wall 36 and extends upwardly therefrom some distance along side walls 38 and end walls 40. Tray 34 with its contents is then placed in a freezer 44 (FIG. 4) in order to freeze food assembly 16 so that it becomes a frozen molded form having the shape of cavity 42 of tray 34 except for the upper surface which remains in whatever form the various parts of the food are disposed. Food assembly 16 is thus a substantially rectangular frozen slab having a rear which is flat and an outer perimeter having straight flat opposed sides 46A and B and straight flat opposed ends 48A and 48B. These flat outer surfaces are formed primarily of frozen liquid 22A except for any pieces of the food which contacted the various walls of tray 34 during the process of producing the frozen form. Preferably, the shape of the frozen molded form when inserted in bag 12 helps align the main part of assembly 16, such as meat 18, with window 14 for desirable display.

Once frozen, food assembly 16 is removed from tray 34 as shown in FIG. 5 and inserted as indicated at Arrow A into the interior of bag 12 via an entrance opening 50 at end 28A. As noted above, the formation of assembly 16 as a block or unit is helpful in its handling. With meat 18 and pieces 20 embedded in frozen liquid 22A, assembly 16 may be easily popped out of cavity 42 of tray 34 as a unit without, or substantially without, losing any of the components making up assembly 16. Likewise, frozen assembly 16 is easily handled manually or by machine for insertion into bag 12 without such a loss.

Once food assembly 16 is fully inserted, bag 12 is sealed adjacent end 28A thereof as shown in FIGS. 6 and 6A. More particularly, FIG. 6 shows bag 12 adjacent end 28A being heat sealed by a suitable heat sealing device 52. Preferably, end 28A is then folded over as indicated at Arrow B in FIG. 6A and sealed with an adhesive 54 to further secure the bag in a closed position. The heat sealing of bag 12 provides a sealed environment for containing food assembly 16 in the frozen and liquid states.

Figure 7:
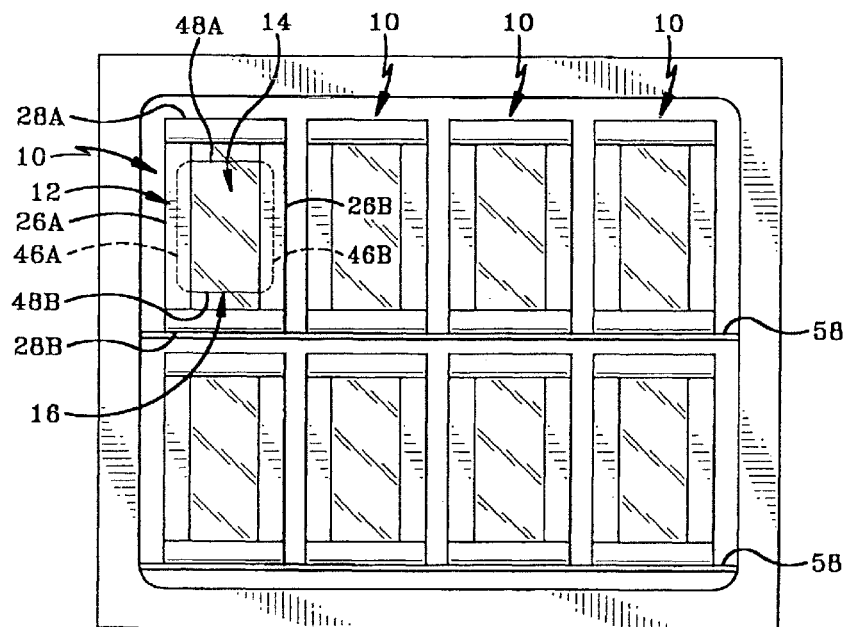
FIG. 7 is a diagrammatic elevational view of a plurality of the food bags on display in a store freezer section.

Once food assembly 16 is frozen and sealed within bag 12, it is ready for shipping while frozen to stores or other commercial establishments, where it may be displayed in a freezer section 56 as shown in FIG. 7. Packages 10 may be displayed as desired, but are preferably either laid on their rear surfaces or stood upright on one of sides 26 or ends 28 on a shelf 58. Display window 14 allows customers to see the fresh ingredients inside bag 12 to make the product more appealing. In addition, bags 12 may be individually or singly boxed in so-called inner boxes to individually protect bag 12 and its contents, and the inner boxes packed in a larger outer box or container for shipping. Thus, for instance, pictures or images of food assembly 16 in a cooked and/or uncooked state may be applied to the inner boxes instead of displaying bags 12 in an exposed manner which could lead to bags 12 being damaged.

Figures 8, 9:
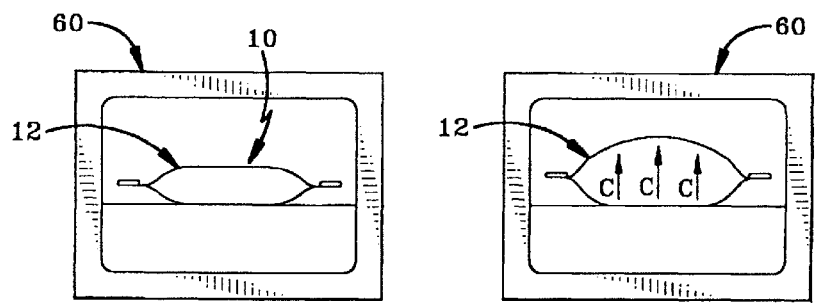
FIG. 8 is a diagrammatic side elevational view showing the frozen food package in an oven at an initial stage of cooking.
FIG. 9 is similar to FIG. 8 and shows the food bag having expanded as a result of the cooking process.

The integrity of the frozen unit of assembly 16 is fully, or substantially fully, maintained throughout the handling and shipping processes, including handling by the consumer. This ability for assembly 16 to remain substantially in its original form is a significant benefit during these various processes and results in delivery of a product which is appealing to the consumer without product loss. Once purchased, the consumer is able to place package 10 while still frozen directly into a standard or microwave oven 60 as shown in FIG. 8 and cook food assembly 16 within bag 12, which expands as indicated at Arrows C in FIG. 9 as steam is generated therewithin.

The steam and a degree of pressure which builds up within bag 12 facilitates the cooking of food assembly 16 while bag 12 retains the liquids therewithin during the cooking process. More particularly, bag 12 remains sealed during the cooking process and holds in the steam so that the inside of bag 12 becomes saturated with steam. In further detail, frozen liquid 22A when heated in the cooking process melts and vaporizes before the other components in bag 12 due to its lower, more water-like viscosity. These other components include any sauce in bag 12, meat 18 and pieces 20. Typically, liquid 22A is completely vaporized while meat 18, pieces 20 and any sauce in bag 12 remain frozen or substantially frozen. In a relatively short period, bag 12 becomes completely saturated with the hot water vapor. The water vapor in bag 12 typically reaches a temperature of about 217-218° F. and condenses on the frozen food.

This condensation process provides substantial heat transfer to and penetration into the food and thus accelerates the cooking process while simultaneously allowing moisture within the food to be retained therein, in other words preventing dehydration of the food. More particularly, the steam derived from liquid 22A prevents or substantially prevents the intra-molecular water within the food from creating steam which would cause product dehydration. For the typical meal-sized contents of bag 12, the melted liquid originating from frozen liquid 22A typically vaporizes sometime during the first one or two minutes of cooking although this may vary.

The relatively early vaporization of liquid 22 is a key in preventing sauces within bag 12 from burning. Simply adding more sauce, which is usually much more viscous than liquid 22, normally will not provide the vaporization needed without the use of liquid 22. The typical sugar content of such sauces makes them quite susceptible to various chemical reactions such as caramelizing without the use of liquid 22. The vaporization of liquid 22 thus prevents the reduction or dehydration of the sauce and the increase in its viscosity that would occur as a result. This process also prevents the sauce from boiling, from caramelizing or from undergoing chemical reactions such as a Maillard reaction. In short, the present process allows moisture within the food items of assembly 16 to remain in the food items to produce a meal which is substantially more moist than that produced by known prior art methods.

Figure 10:
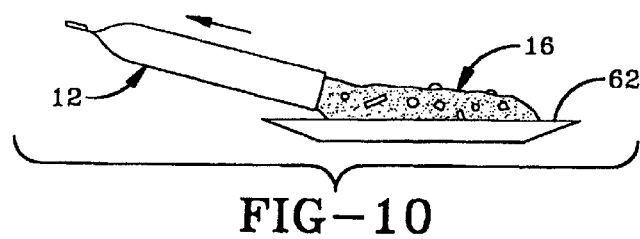
FIG. 10 shows the food bag having been opened and the cooked food items being removed therefrom onto a plate.

Once cooked, package 10 is removed from oven 60, bag 12 is opened and food assembly 16 is removed from bag 12 as indicated in FIG. 10 onto a platter 62 or the like. Alternately, window 14 may be cut open and the meal eaten directly from the bag if desired while retaining the liquids therein. Bag 12 is also conveniently removable from oven 60 after cooking without the user getting burned. More particularly, the folded ends 28 of bag 12 are only minimally heated during cooking and thus serve as relatively cool handles which may typically be grasped directly for removal of bag 12 while avoiding such a burn risk.

Thus, package 10 and the method of producing and using the same provides a very convenient way of obtaining a very healthy and nutritionally balanced meal for the consumer. In addition, the use of fresh uncooked ingredients which are immediately frozen and stored in bag 12 provides a product which when cooked as described is a substantial improvement over the prior art methods of reheating food that has already been cooked. The retention of steam within bag 12 minimizes moisture loss from the food to keep the meal quite moist, especially in contrast to packages that are opened during the cooking process. This method also allows the production of a meal having a high quality taste without the necessity of providing preformed sauces, as previously noted. However, such sauces are often used, and the method advantageously prevents them from dehydrating, burning and so forth. In addition, this method is effective without the use of chemical preservatives.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:
    creating a frozen food assembly that comprises frozen food and frozen liquid, wherein the frozen food has an outer perimeter and the frozen liquid fully surrounds the outer perimeter of the frozen food, and wherein the step of creating a frozen food assembly comprises:
        freezing food and liquid in a cavity of a container to produce the frozen food assembly in which the frozen food is disposed in a middle of the assembly and the frozen liquid fully surrounds the frozen food, and
        removing the frozen food assembly from the container prior to cooking;
    placing the frozen food assembly, including the frozen liquid, into, and in contact with, a liquid-impermeable bag which is at least one of ovenable and microwavable, and which is formed of two layers, wherein an outer layer is paper and an inner layer is a plastic sheet, said plastic sheet contacting the paper as well as the frozen food assembly; and
    sealing the bag so that the bag is impermeable to liquids, said bag being configured such that the bag retains steam within the bag during cooking of the frozen food.

2. The method according to claim 1, wherein the step of placing the frozen food assembly, including the frozen liquid, into, and in contact with, a liquid-impermeable bag which is at least one of ovenable and microwavable comprises contacting the frozen liquid with the bag when the frozen food assembly is placed in the bag.

3. The method according to claim 1, wherein the step of placing the frozen food assembly, including the frozen liquid, into, and in contact with, a liquid-impermeable bag which is at least one of ovenable and microwavable comprises placing the frozen food assembly, including the frozen liquid, into, and in contact with a bag which provides a sealed enclosure for cooking the frozen food assembly.

4. The method according to claim 1, wherein the frozen food and the frozen liquid are configured such that when the frozen food assembly cooks in the bag, the frozen liquid turns into steam and condenses on the frozen food.

5. The method according to claim 1, wherein the viscosity of the frozen liquid is such that, during cooking, the frozen liquid melts and vaporizes before the frozen food such that steam is created, and the steam condenses on the frozen food.

6. The method according to claim 1, wherein the step of creating a frozen food assembly comprises creating a frozen food assembly that includes a frozen source of protein.

7. The method according to claim 1, wherein the step of creating a frozen food assembly comprises creating a frozen food assembly that comprises at least one of a frozen uncooked vegetable and a frozen fruit.

8. The method according to claim 1, wherein the step of placing the frozen food assembly in a bag comprises placing the frozen food assembly in a bag which has a window.

9. A method comprising the steps of:
   creating a frozen food assembly that comprises frozen food and frozen liquid, wherein the frozen food has an outer perimeter and the frozen liquid fully surrounds the outer perimeter of the frozen food, and wherein the step of creating a frozen food assembly comprises:
   freezing food and liquid in a cavity of a container to produce the frozen food assembly in which the frozen food is disposed in a middle of the assembly and the frozen liquid fully surrounds the frozen food, and
   removing the frozen food assembly from the container prior to cooking;
   placing the frozen food assembly, including the frozen liquid, into, and in contact with a bag which is at least one of ovenable and microwavable and which is formed of two layers, wherein an outer layer is paper and an inner layer is a plastic sheet, said plastic sheet contacting the paper as well as the frozen food assembly; and
   sealing the bag so that the bag is impermeable to liquids, said bag being configured such that the bag retains steam within the bag during cooking of the frozen food, wherein the bag is configured to provide a sealed enclosure for cooking the frozen food assembly.

* * * * *